United States Patent
Hogsden et al.

(10) Patent No.: US 6,742,534 B2
(45) Date of Patent: Jun. 1, 2004

(54) METHOD OF DAMPING SURGES IN A LIQUID SYSTEM

(76) Inventors: Richard John Hogsden, Pinch Cottage, The Green Hallow, Worchester, Worchestershire (GB), WR2 6PE; Simon John Williams, Lane End, Newham Bottom, Ruardean, Glouchestershire (GB), GL17 9UB; Ian Peter Currie, 3 Lytton Avenue, Penn, Wolverhampton, West Midlands (GB), WV4 4HN (*) Notice: Subject to any disclaimer, the term of this patent is extended or adjusted under 35 U.S.C. 154(b) by 100 days.

(21) Appl. No.: 10/158,517
(22) Filed: May 30, 2002
(65) Prior Publication Data
US 2003/0221722 A1 Dec. 4, 2003

(51) Int. Cl.⁷ ................................. G05D 16/20
(52) U.S. Cl. .......................... 137/12; 137/207
(58) Field of Search ............ 137/12, 207, 210

(56) References Cited

U.S. PATENT DOCUMENTS

| | | | |
|---|---|---|---|
| 4,146,052 A | 3/1979 | Bublik et al. | 137/574 |
| 4,562,036 A | 12/1985 | Shin et al. | 376/283 |
| 4,819,698 A | 4/1989 | Ismert | 138/31 |
| 4,921,004 A | 5/1990 | Lane et al. | 137/318 |

FOREIGN PATENT DOCUMENTS

| | | | |
|---|---|---|---|
| GB | 2219349 | 12/1989 | |
| JP | 56-28399 A | * 3/1981 | 137/207 |

* cited by examiner

Primary Examiner—Gerald A. Michalsky
(74) Attorney, Agent, or Firm—MacMillan, Sobanski & Todd, LLC

(57) ABSTRACT

A method of damping surges in a liquid system includes providing in the system, a surge vessel in which there is trapped air or other gas, the surge vessel being positioned so that in the event of a surge in the system (10), the volume of trapped air or other gas within the surge vessel changes to damp the surge, the method including maintaining generally constant the mass of the trapped air or other gas in the surge vessel is maintained generally constant, irrespective of the liquid level within the surge vessel.

10 Claims, 2 Drawing Sheets

METHOD OF DAMPING SURGES IN A LIQUID SYSTEM

BACKGROUND TO THE INVENTION

This invention relates to a method of damping surges in liquid systems.

DESCRIPTION OF THE PRIOR ART

It is known in a pumped-liquid system to utilise a surge vessel in which there is provided a trapped volume of gas, usually air; so that in the event of a surge, the trapped air volume in the vessel damps the surge. Surge conditions may occur for various reasons, typically but not limited to normal liquid pump start/stop sequences, pump failure, power supply failure and general control and valve failure in the liquid system, or even as a result of a major liquid flow valve being opened or closed, or rapidly changing demand.

It will be appreciated that in a pumped-liquid system such as a mains or foul water system, the pumping regime is varied in accordance with varying demand i.e. the pumped volume is varied. Accordingly, conventionally to accommodate different pumping regimes, air is introduced into or released from the surge vessel thus to maintain generally constant the liquid level within the vessel. This is achieved by means of air inlet and outlet valves controlled by a control means which is sensitive to the liquid level within the vessel, and an air compressor.

However, in use, particularly where the trapped air is at high pressure, some of the air tends to dissolve in the liquid in the surge vessel, and thus periodic "topping up" of the air within the surge vessel is required, and each time the pumping regime changes, air has to be either introduced into the surge vessel by operating the air compressor and inlet valve, or released from the surge vessel by operating the air release valve thus to maintain generally constant the liquid level within.

Frequent operation of the air inlet valve and compressor, and the outlet valve as the liquid level within the surge vessel changes, is undesirable, and so as not to introduce into or release from the surge vessel too much air, adjustments have to made slowly, which can be problematic where pumping regimes are frequently changed. Moreover, upon releasing excess air from the surge vessel, noise can be generated which is environmentally undesirable.

SUMMARY OF THE INVENTION

According to a first aspect of the invention we provide a method of damping surges in a liquid system, the method including providing in the system, a surge vessel in which there is trapped air or other gas, the surge vessel being positioned so that in the event of a surge in the system, the volume of trapped air or other gas within the surge vessel changes to damp the surge, the method being characterised in that the mass of the trapped air or other gas in the surge vessel is maintained generally constant, irrespective of the liquid level within the surge vessel It will be appreciated that by using the method of the invention, there is generally no need to release air or other gas from the surge vessel to maintain the damping effect of the surge vessel e.g. in a pumped-liquid system, for different pumping regimes, and moreover, there is no need to "top-up" the air or other gas within the surge vessel to accommodate different pumping regimes. Thus the air or other gas compressor usage may be minimised, and moreover there is no need to operate an air or other gas release valve to release air or other gas from the surge vessel to accommodate different pumping regimes. Thus noise generated by the method of the invention is generally reduced compared with a conventional system.

Utilising the invention, regardless of the pumping regime, the mass of the air or other gas trapped within the surge vessel is maintained constant. Otherwise, to damp surges in the pumped-liquid system, the surge vessel is operated substantially conventionally, with the trapped air or other gas acting on the liquid in the surge vessel to damp the surges in the liquid.

It will be appreciated from Boyle's gas law that the product of pressure and volume is proportional to the mass of the trapped air or other gas. Thus by sensing the pressure and volume of the trapped air or other gas, a control means may be utilised to respond to changing trapped air or other gas mass. In practice, the mass of the trapped air or other gas is most likely to decrease as air or other gas is dissolved in the liquid in the surge vessel, so that the volume of the trapped air or other gas will decrease.

Thus the method may include responding to a decrease in the volume of the trapped air or other gas, to introduce more air or other gas into the surge vessel to restore the mass of the trapped air or other gas to a set value.

The method may include sensing the pressure of the trapped air or other gas in the surge vessel and determining a measure of the volume of the trapped air or other gas, and providing respective inputs to a control apparatus which responds to the inputs to maintain the mass of air or other gas trapped in the surge vessel generally constant.

In one example, a measure of the volume of the trapped air or other gas may be determined by monitoring the liquid level, in the surge vessel. Thus by knowing the volume of the surge vessel which will be constant or substantially constant, a measure of the volume of the trapped air or other gas may be determined.

For example, the liquid level in the surge vessel may be monitored by determining a differential pressure between the pressure of air or other gas trapped in the surge vessel and the pressure exerted by the mass of liquid in the surge vessel. From this differential pressure, again by knowing dimensions of the surge vessel, the volume of liquid and hence of the trapped air or other gas may be determined.

The control apparatus may be arranged to respond to inputs which indicate a decrease in the mass of the trapped air or other gas, by operating an air or other gas compressor and introducing more air or other gas into the surge vessel until the mass of the trapped air or other gas again attains a set value.

According to a second aspect of the invention we provide a control apparatus for use in damping surges in a liquid system, the system including a surge vessel in which there is trapped air or other gas, the surge vessel being positioned so that in the event of a surge in the system, the volume of trapped air or other gas within the surge vessel changes to damp the surge wherein the control apparatus includes a processor which responds to inputs from a sensor apparatus to determine a measure of the mass of the trapped air or other gas in the surge vessel, and a pump for introducing air or other gas into the surge vessel to maintain the mass of trapped air or other gas generally constant.

In one embodiment, the control apparatus includes a first sensor such as a pressure transducer, to sense the pressure of the trapped air or other gas in the surge vessel and to provide a first electrical input to the processor, and a second sensor, again such as a pressure transducer, to sense the pressure exerted by the liquid in the surge vessel, and to provide a second electrical input to the processing means.

BRIEF DESCRIPTION OF THE DRAWINGS

The invention will now be described with reference to the accompanying drawings in which.

DESCRIPTION OF THE PREFERRED EMBODIMENTS

Figure 1:
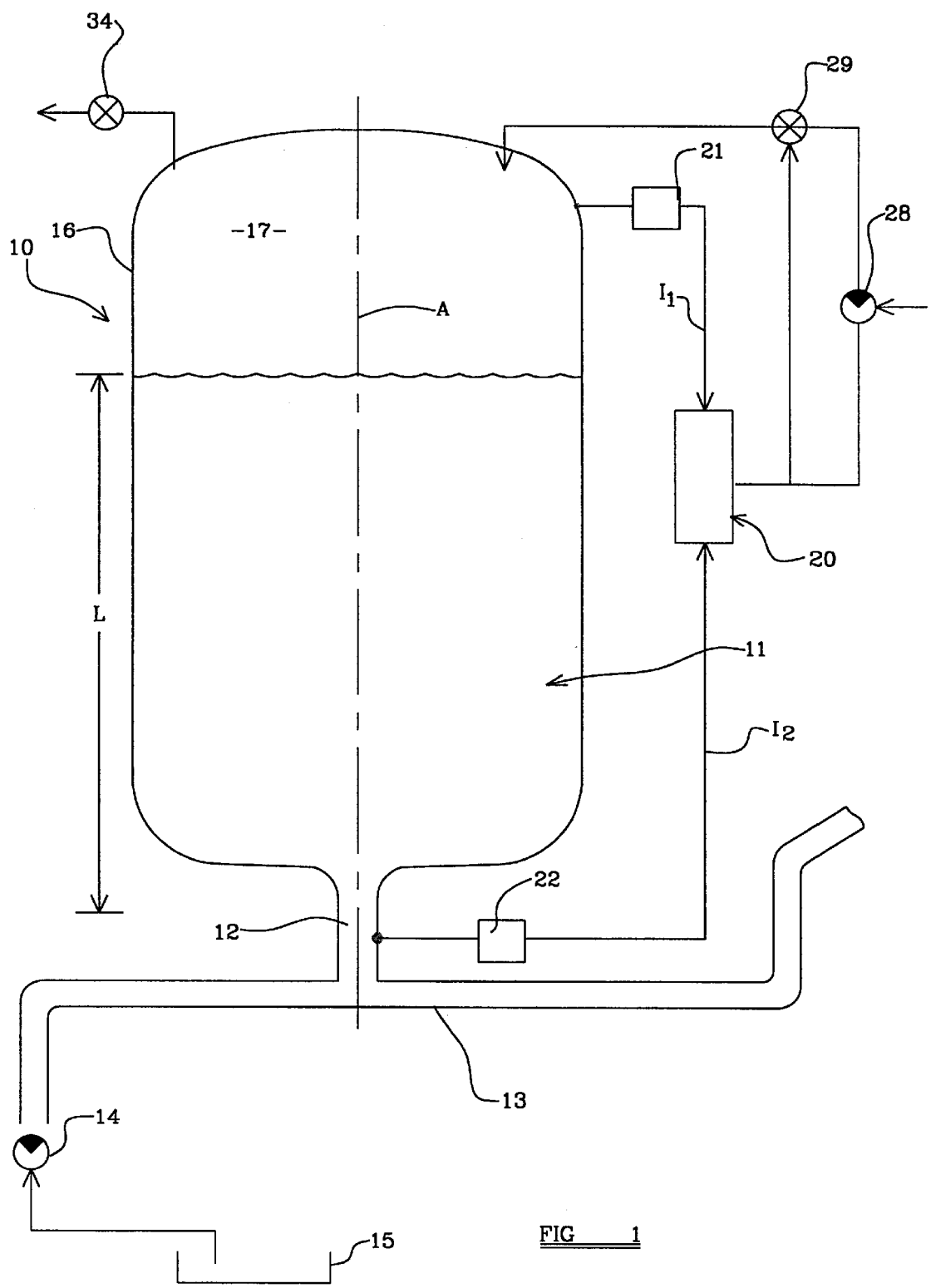
FIG. 1 is a schematic illustration of a pumped-liquid system which includes surge damping means operated by the method of the invention.

Referring to the drawings, a pumped-liquid system 10 includes a surge vessel 11 which in this example is a generally cylindrical vessel arranged with its longitudinal axis A arranged generally vertically. In another arrangement the vessel 11 may be arranged with its longitudinal axis A arranged generally horizontally. In each case, the vessel 11 is connected at a lowermost part 12, to a liquid carrying conduit 13 of a liquid system, into which conduit liquid is pumped, e.g. from a reservoir 15, by a pump 14.

The conduit 13 may be part of a water supply system, a foul or storm water disposal system, or any other pumped-liquid system in which surge liquid conditions in the conduit 13 may occur. In a pumped-liquid system, such surges may be as normal liquid pump start/stop sequences, pump failure, power supply failure or a control/valve failure in the liquid system, or otherwise.

In each case, to damp the surge, and to prevent the surge resonating and potentially causing damage in the pumped liquid-system, or at least unwanted noise, air or other gas, usually air, is trapped in an upper part 16 of the surge vessel 11 as indicated at 17.

Typically in a system as described, a surge will result first in a fall in the liquid level L in the surge vessel 11 as liquid is drawn from the surge vessel 11 into the conduit 13 through the lower end of the vessel, and then, as the surge returns, the liquid level in the surge vessel 11 will rise as a result of liquid entering the surge vessel 11 from the conduit 13, through the lower end 12 of the vessel 11. Consequently in surge conditions, the volume of the trapped air in the surge vessel 11 will fluctuate resulting in corresponding fluctuations in the pressure of the trapped air 17 which will act on the liquid in the surge vessel 11 to damp the surge.

To accommodate changing conditions, e.g. demand, the liquid pump 14 may be operated to pump different liquid volumes. For example, the pump 14 may be a rotary pump which is turned faster or slower to vary the pumped volume, or may be a swashplate pump the angle of a swashplate of which is changed to vary the pumped volume, or the pump 14 may be a reciprocating pump of which the speed is made faster or slower to vary the pumped volume.

In accordance with the present invention, the mass of the trapped air 17 in the surge vessel 11 is maintained generally constant irrespective of the pumping regime, so that there is less need to introduce air into the upper part 16 of the surge vessel 11, and generally no need to release air from the surge vessel 11, as is required by conventional methods in which the liquid level in the surge vessel 11 is maintained generally constant for differing pumping regimes.

The method of the invention utilises a control apparatus 20 which includes a first pressure sensor 21 to sense the pressure of the trapped air 17 in the upper part 16 of the surge vessel 11, which is a transducer which provides a first electrical input signal $I_1$, and a second pressure sensor 22 to sense the pressure exerted by the liquid in the surge vessel 11, the second sensor 22 being positioned at the lower part 12 of the surge vessel 11 or at another known height position on the surge vessel 11. The second sensor 22 also is a transducer, which provides a second electrical input signal $I_2$.

The first and second electrical input signals $I_1$, $I_2$ are both fed to a processor 24 which responds by providing a control signal 26 to operate or stop operating an air compressor pump 28 and air inlet valve 29.

When the control apparatus 20 determines that the mass of trapped air 17 in the surge vessel 11 has decreased, e.g. as a result of air being dissolved into the liquid in the surge vessel 11, or as a result of air leakage or otherwise, the control apparatus 20 operates the air compressor pump 28 and opens the inlet valve 29, to admit more air into the surge vessel 11.

Figure 2:
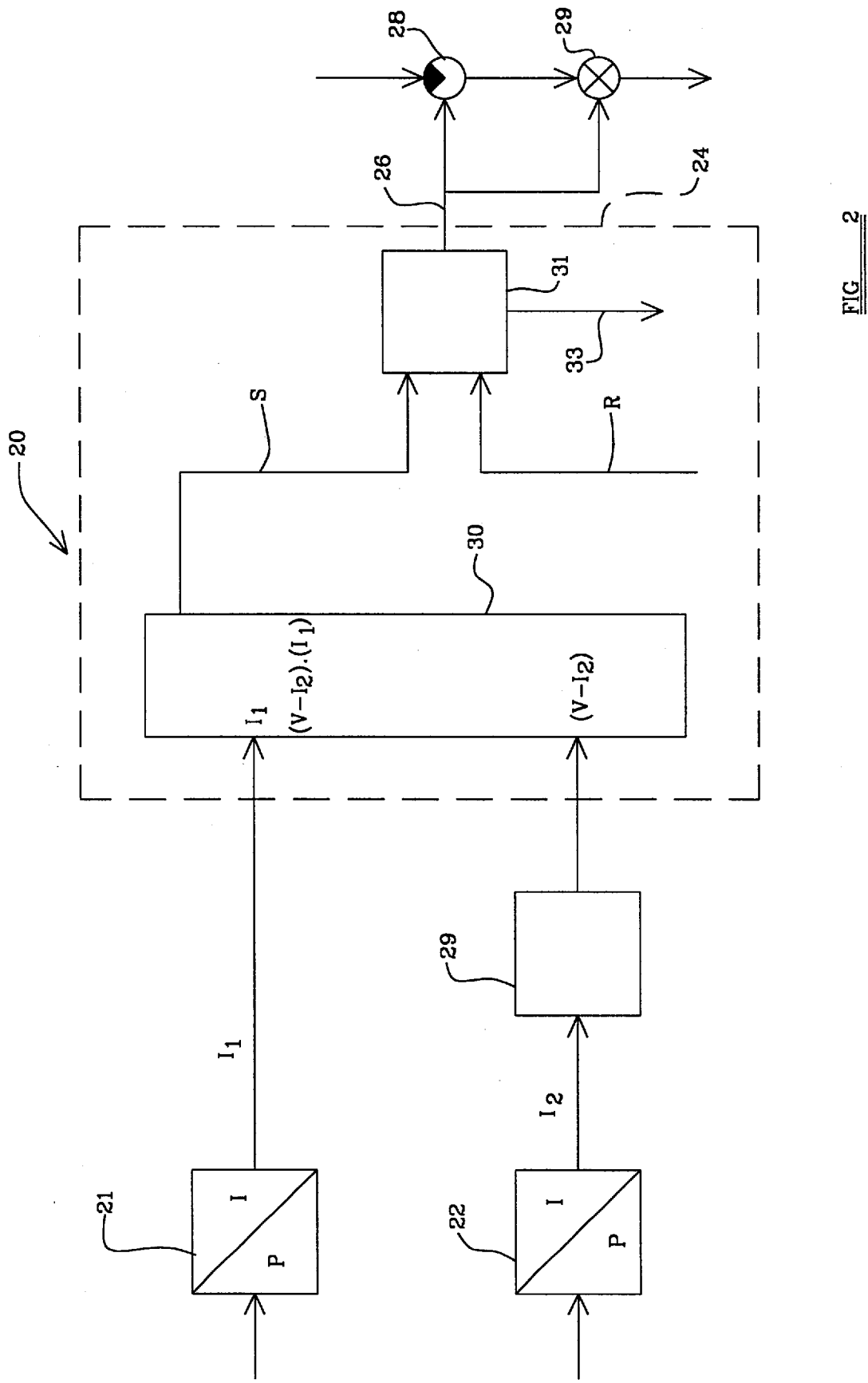
FIG. 2 is an illustrative view of a control means of the system of FIG. 1.

Referring in more detail to FIG. 2, the second input $I_2$ is linearised, prior to input into the processor 24, by means of a linearising circuit 29 which is provided to ensure that the first and second input signals $I_1$, $I_2$ are to the same scale.

From the second input signal $I_2$ the processor 24 determines a measure of the volume of the trapped air 17 in the surge vessel 11. This is achieved as the total volume V of the surge vessel 11 is known and from the second pressure sensor 22, the pressure sensed will enable a measure of the level L of the liquid in the surge vessel 11 to be determined. Accordingly the volume of the trapped air 17 will be the total volume V minus the volume of the liquid. Thus the volume of the trapped air 17 in the surge vessel is indicated by V–$I_2$ in FIG. 2, whilst the pressure of the trapped air 17 is indicated by input signal $I_1$.

According to Boyle's law:

$$PV \alpha M \quad (1)$$

where P is the pressure of the trapped air 17, and V is the volume of the trapped air 17, and M is the mass of the trapped air 17.

Thus the processing means 24 includes a multiplier 30 which multiplies:

$$(I_1)(V-I_1) \quad (2)$$

to obtain a signal S which is indicative of the mass M of the trapped air or other gas 17. This signal S is compared in a comparator 31 with a reference signal R indicative of a desired mass value of the trapped air or other gas 17, in order to produce the control signal 26.

Desirably, to prevent the system responding to minor changes in the determined mass of the trapped air 17, the comparator 31 is arranged only to provide a control signal 26 to operate the air compressor 28 and open the air inlet valve 29, when it is determined that the mass has fallen below a threshold level at a lower end of a pressure range. The air compressor 28 may be operated and the air inlet valve opened 29, until the mass of the trapped air 17 reaches a higher threshold value of the pressure range. The pressure range may be relatively small so that the actual mass of the trapped air 17 is maintained at generally a constant set value, irrespective of the pumping regime of the liquid pump 14.

Although most commonly the trapped air 17 mass will decrease in use, if for any reason the mass of trapped air 17, should increase, for example due to air entering the surge vessel 11 from the conduit 11, or air or other gas being produced by reactions in the liquid in the surge vessel 11, such increase in trapped air/air or other gas 17 mass may be determined by the control apparatus 20, and a control signal 33 issued e.g. by the comparator means 31 automatically to open a relief valve 34 to enable air to be released from the surge vessel 11 so as to maintain the mass of trapped air 17 in the surge vessel 11 generally constant. Alternatively or additionally, a warning may be transmitted to an operator who may take remedial action to release excess air/air or other gas from the surge vessel 11.

In a conventional arrangement where the system 10 is controlled to maintain the liquid level in the surge vessel 11 constant, variations in the liquid level L occurring as a result of the normal operation of the system cannot be discriminated from variations in liquid level occurring as a result of e.g. a changed pumping regime, without some input from a controller of the liquid pump 14. It will be appreciated that by operating the system in accordance with the present invention, the control apparatus 20 is insensitive to changes in liquid level L occurring in the surge vessel 11 as a result of normal operation of the system 10, because the volume of the trapped air 17 is proportional to its pressure. Thus there is no need to provide any input from a pump 14 controller when changing pumping regime.

Various modifications may be made without departing from the scope of the invention. For example, the components of the control apparatus 20 described are only given as examples and alternative components and control arrangements may be utilised in order to perform the method of the invention.

In one alternative embodiment, if desired, the mass of air or other gas trapped in the surge vessel 11 may actively be varied in accordance with e.g. particular pumping regimes, e.g. by varying the reference signal R. Alternatively or additionally, the reference signal R may be varied to accommodate ambient and/or liquid temperature changes in the system 10 to ensure that the control signal 26 operates the air compressor pump 28 and air inlet valve 29 and/or the air or other gas release valve 34 appropriately to maintain the mass of the trapped air or other gas 17 generally constant as ambient and/or liquid temperatures vary.

The system of the invention may be used independently of or in conjunction with another control system relating to the pumped-liquid system 10.

In another system, the liquid in which surges may occur, need not be pumped.

What is claimed is:

1. A method of damping surges in a liquid system, the method including providing in the system, a surge vessel in which there is trapped gas above a liquid level in the surge vessel, the surge vessel being positioned so that in the event of a surge in the system, the volume of trapped gas within the surge vessel changes to damp the surge, the method including maintaining generally constant the mass of the trapped gas in the surge vessel for different pumping regimes, irrespective of the liquid level within the surge vessel including responding to a decrease in the volume of the trapped gas to introduce more gas into the surge vessel to restore the mass of the trapped gas to a set value.

2. A method according to claim 1 wherein the method includes sensing the pressure of the trapped gas in the surge vessel and determining a measure of the volume of the trapped gas, and providing respective inputs to a control apparatus which responds to the inputs to maintain the mass of air or other gas trapped in the surge vessel generally constant.

3. A method according to claim 2 wherein a measure of the volume of the trapped air or other gas is determined by monitoring the liquid level, in the surge vessel.

4. A method according to claim 3 wherein the liquid level in the surge vessel is monitored by determining a differential pressure between the pressure of gas trapped in the surge vessel and the pressure exerted by the mass of liquid in the surge vessel.

5. A method according to claim 2 wherein the control apparatus responds to inputs which indicate a decrease in the mass of the trapped gas, by operating a gas compressor and introducing more gas into the surge vessel until the mass of the trapped gas again attains a set value.

6. A control apparatus for use in damping surges in a liquid system, the system including a surge vessel in which there is trapped gas, the surge vessel being positioned so that in the event of a surge in the system, the volume of trapped gas within the surge vessel changes to damp the surge and wherein the control apparatus includes a processor which responds to inputs from sensor apparatus to determine a measure of the mass of the trapped gas in the surge vessel, and a pump for introducing gas into the surge vessel to maintain the mass of trapped air or other gas generally constant.

7. A control apparatus according to claim 6 which includes a first sensor to sense the pressure of the trapped air or other gas in the surge vessel and to provide a first electrical input to the processor.

8. A control apparatus according to claim 7 which includes a second sensor to sense the pressure exerted by the liquid in the surge vessel, and to provide a second electrical input to the processor.

9. A method of damping surges in a liquid system comprising the steps of;
    a) providing a surge vessel connected to receive liquid from the system and in which a volume of trapped gas above a liquid level in the surge vessel changes in response to changes in liquid pressure in the system; and
    b) adjusting the mass of trapped gas in the surge vessel to maintain a substantially constant mass.

10. A method of damping surges in a liquid system according to claim 9, and wherein the mass of trapped gas is adjusted in response to the pressure and the volume of trapped gas in the surge vessel.

* * * * *

UNITED STATES PATENT AND TRADEMARK OFFICE
CERTIFICATE OF CORRECTION

PATENT NO. : 6,742,534 B2
DATED : June 1, 2004
INVENTOR(S) : Richard John Hogsden et al.

It is certified that error appears in the above-identified patent and that said Letters Patent is hereby corrected as shown below:

Title page,
Item [75], Inventors, please correct the inventors address' as listed below:
-- Richard John Hogsden, Pinch Cottage, The Green, Hallow, Worcester, Worcestershire(GB), WR2 6PE; Simon John Williams, Lane End, Newham Bottom, Ruardean, Gloucestershire (GB), GL 17 9UB; --

Signed and Sealed this

Twenty-seventh Day of July, 2004

JON W. DUDAS
*Acting Director of the United States Patent and Trademark Office*